(12) United States Patent
Hsieh

(10) Patent No.: US 9,234,544 B2
(45) Date of Patent: Jan. 12, 2016

(54) LUBRICATING STRUCTURE FOR LINEAR MOTION GUIDE APPARATUS

(71) Applicant: Hiwin Technologies Corp., Taichung (TW)

(72) Inventor: Min Yao Hsieh, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 32 days.

(21) Appl. No.: 14/072,830

(22) Filed: Nov. 6, 2013

(65) Prior Publication Data
US 2015/0125100 A1   May 7, 2015

(51) Int. Cl.
*F16C 33/66* (2006.01)
*F16C 29/06* (2006.01)

(52) U.S. Cl.
CPC ......... *F16C 29/0609* (2013.01); *F16C 33/6674* (2013.01); *F16C 33/6681* (2013.01); *F16C 29/0647* (2013.01)

(58) Field of Classification Search
CPC ..................... F16K 15/04; F16N 29/02; F16C 33/66–33/6696; F16C 29/00–29/126
USPC .............. 184/7.4, 34, 65, 76, 79; 137/533.11; 251/281
See application file for complete search history.

(56) References Cited

U.S. PATENT DOCUMENTS

| | | | | |
|---|---|---|---|---|
| 4,944,327 A * | 7/1990 | Gyben | ....................... | 137/519.5 |
| 5,380,096 A * | 1/1995 | Tanaka | ............................. | 384/13 |
| 5,380,097 A * | 1/1995 | Tanaka | ............................. | 384/13 |
| 5,582,486 A * | 12/1996 | Tsukada | ......................... | 384/13 |
| 7,044,641 B2 | 5/2006 | Scotte et al. | | |
| 7,146,870 B2 * | 12/2006 | Kuo et al. | .................... | 74/89.44 |
| 7,435,000 B2 * | 10/2008 | Neufang et al. | ................ | 384/45 |
| 7,556,430 B2 | 7/2009 | Wu et al. | | |
| 7,604,408 B2 * | 10/2009 | Dorn et al. | ...................... | 384/45 |
| 7,658,544 B2 | 2/2010 | Chen et al. | | |
| 7,686,514 B2 | 3/2010 | Hung et al. | | |
| 7,736,059 B2 | 6/2010 | Chen et al. | | |
| 8,082,814 B2 * | 12/2011 | Jiang et al. | .................... | 74/89.44 |
| 2006/0231335 A1 * | 10/2006 | Lin et al. | ............................ | 184/5 |

FOREIGN PATENT DOCUMENTS

DE   10121361 A1 * 12/2002   ............. F16N 13/22

* cited by examiner

*Primary Examiner* — Alan B Waits
(74) *Attorney, Agent, or Firm* — Charles E. Baxley

(57) ABSTRACT

A linear motion guide device includes a slider slidably attached onto a guide rail, an end cap having an inner side attached to the slider, the end cap includes an inlet for receiving a lubricating fluid, two chambers formed in two legs, a passage communicating with the chambers, a guiding pathway communicating with the inlet and the passage for separating the passage into two passageways which are communicating with the chambers of the end cap respectively, and a follower is slidably engaged in the guiding pathway and movable toward either the passageways of the end cap for partially blocking and for limiting the flowing of the lubricating fluid to the passageways of the end cap.

6 Claims, 6 Drawing Sheets

LUBRICATING STRUCTURE FOR LINEAR MOTION GUIDE APPARATUS

BACKGROUND OF THE INVENTION

1. Field of the Invention

The present invention relates to a linear motion guide apparatus, and more particularly to a linear motion guide apparatus including a lubricating device or arrangement or structure designed and arranged for suitably and uniformly sending or applying or supplying the lubricant or lubricating oil or fluid to various portions or positions or locations of the linear motion guide apparatus, particularly when the linear motion guide apparatus is disposed and located or supported on a tilted or inclined position or posture or status relative to the supporting ground or surface.

2. Description of the Prior Art

Various kinds of typical linear motion guide devices have been developed and comprise a slider or follower or slide block slidably attached onto a guide rail, and normally, a ball bearing device is disposed between the slider and the guide rail for facilitating the sliding movement between the slider and the guide rail and for allowing the slider and the guide rail to be smoothly moved relative to each other.

For example, the applicant has also developed various kinds of typical linear motion guide devices or apparatuses as disclosed in the following patents, U.S. Pat. No. 7,044,641 to Scotte et al., U.S. Pat. No. 7,556,430 to Wu et al., U.S. Pat. No. 7,658,544 to Chen et al., U.S. Pat. No. 7,686,514 to Hung et al., U.S. Pat. No. 7,736,059 to Chen et al., and U.S. Pat. No. 8,082,814 to Jiang et al. disclose several of the typical linear motion rolling guide units or devices or apparatuses each comprising a slider or slide block slidably attached onto a guide rail, and a ball bearing device disposed and engaged between the slider and the guide rail and engaged in the endless ball guiding raceway for facilitating the sliding movement between the slider and the guide rail and for allowing the slider and the guide rail to be smoothly moved relative to each other.

Normally, the slider and the guide rail and/or the ball bearing device are moved in a fast speed relative to each other, and a lubricating device is required to be provided or disposed or engaged in the slider and/or the guide rail for filling or supplying the lubricant or lubricating oil or fluid into the endless ball guiding raceway and the slider and for suitably lubricating the ball bearing device or the like.

However, the lubricant or lubricating oil or fluid is normally required to be filled or supplied into the endless ball guiding raceway with a greater or higher pressure, and the lubricant or lubricating oil or fluid may have a good chance to flow out through the gaps formed between the parts or elements of the linear motion guide apparatus. In addition, the lubricant or lubricating oil or fluid may not be suitably and uniformly sent or applied or supplied to various portions or positions or locations of the linear motion guide apparatus, particularly when the linear motion guide apparatus is disposed and located or supported on a tilted or inclined position or posture or status relative to the ground.

The present invention has arisen to mitigate and/or obviate the afore-described disadvantages of the conventional lubricating structures or devices for linear motion guide devices.

SUMMARY OF THE INVENTION

The primary objective of the present invention is to provide a linear motion guide apparatus including a lubricating device or arrangement or structure designed and arranged for suitably and uniformly sending or applying or supplying the lubricant or lubricating oil or fluid to various portions or positions or locations of the linear motion guide apparatus, particularly when the linear motion guide apparatus is disposed and located or supported on a tilted or inclined position or posture or status relative to the supporting ground or surface.

In accordance with one aspect of the invention, there is provided a linear motion guide apparatus comprising a guide rail, a slider slidably attached onto the guide rail for moving along the guide rail, an end cap including a first side attached to and engaged with the slider and including a second side faced away from the slider, the end cap including a channel formed therein and defined between two legs for slidably receiving and engaging with the guide rail, and including an inlet formed in the end cap for receiving a lubricating fluid, and including two chambers formed in the legs and located in the first side of the end cap respectively, and including a passage formed in the first side of the end cap and communicating with the chambers of the end cap, and including a guiding pathway formed in the first side of the end cap and communicating with the inlet of the end cap for receiving the lubricating fluid from the inlet of the end cap, and the guiding pathway being communicating with the passage of the end cap for separating the passage of the end cap into a first passageway and a second passageway which are communicating with the chambers of the legs of the end cap respectively, and a follower slidably received and engaged in the guiding pathway of the end cap and movable toward either the first passageway or the second passageway of the passage of the end cap for partially blocking either the first passageway or the second passageway of the end cap and for guiding and limiting the flowing speed and/or the flowing quantity of the lubricating fluid from the guiding pathway to either the first passageway or the second passageway of the end cap.

The guiding pathway of the end cap includes an oval or elliptical shape. The end cap includes at least one groove formed therein and communicating with the guiding pathway and the inlet of the end cap for guiding the lubricating fluid to flow from the inlet to the guiding pathway of the end cap.

The follower includes a length smaller than a dimension or size or depth of the guiding pathway of the end cap, and greater than a dimension or size or depth of the passage of the end cap for preventing the follower from being moved or engaged into the passage of the end cap.

A cover may further be provided and attached to the first side of the end cap for contacting or engaging with the follower and for limiting the follower to move within the guiding pathway of the end cap and for preventing the follower from being disengaged from the end cap. The end cap includes a recess formed therein and communicating with the guiding pathway and/or the inlet and/or the passage of the end cap for receiving and engaging with the cover, the cover may also be used for blocking or enclosing the chambers of the legs of the end cap.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 6:
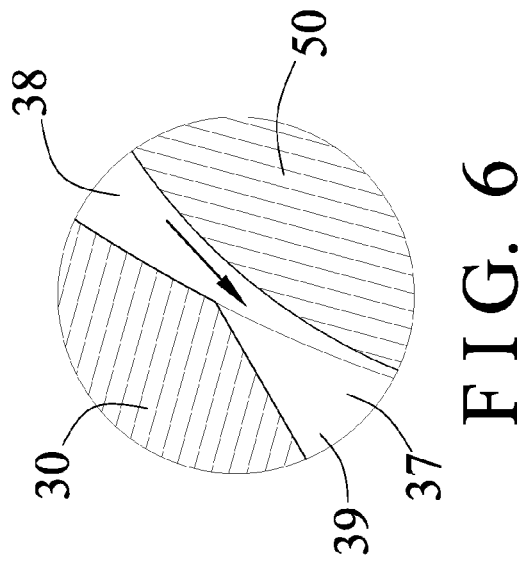
FIG. 6 is another enlarged partial cross sectional view of the linear motion guide apparatus.

Referring to the drawings, and initially to FIGS. 1-4, a linear motion guide apparatus in accordance with the present invention comprises a guide rail 10 including a substantially I-shaped cross section having two longitudinal recesses 11 formed in the side portions thereof, a slide block or a slider 20 slidably attached onto the guide rail 10 and arranged to be moved along the guide rail 10, and normally, and a ball bearing device 8 (FIGS. 4 and 6) disposed between the slider 20 and the guide rail 10 for facilitating the sliding movement between the slider 20 and the guide rail 10 and for allowing the slider 20 and the guide rail 10 to be smoothly moved relative to each other. The slider 20 includes two opposite and longitudinal projections or bulges or protrusions 21 extended therefrom (FIG. 2) for engaging onto or with the longitudinal recesses 11 of the guide rail 10 respectively and for guiding the slider 20 and the guide rail 10 to smoothly move relative to each other.

The linear motion guide apparatus in accordance with the present invention further includes two housings or casings or end caps 30 and two wipers or dust caps 70 disposed or attached or mounted or secured onto the two sides or the outer portions or the end portions 23, 24 of the slider 20 respectively, the end caps 30 and the dust caps 70 each include a channel 31, 71 formed in the lower portion thereof and formed or defined between two legs 32, 72 for slidably receiving or engaging onto the guide rail 10 and for guiding the end caps 30 and the dust caps 70 to smoothly move relative to the guide rail 10. The dust caps 70 and/or the end caps 30 may be solidly and stably attached or mounted or secured to the slider 20 with catches or latches or fasteners 77 and moved in concert with the slider 20.

Figure 1:
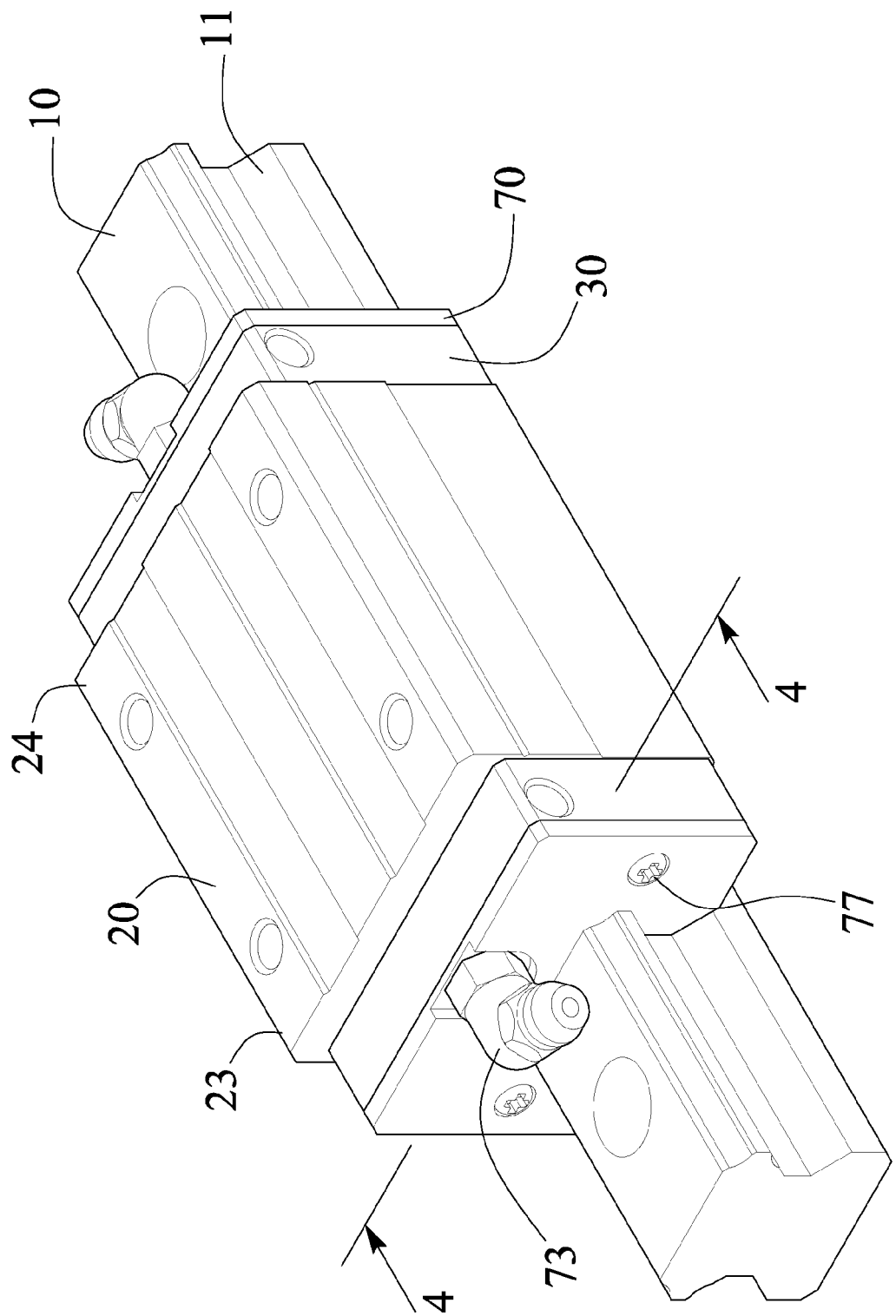
FIG. 1 is a perspective view of a linear motion guide apparatus in accordance with the present invention.
Figure 2:
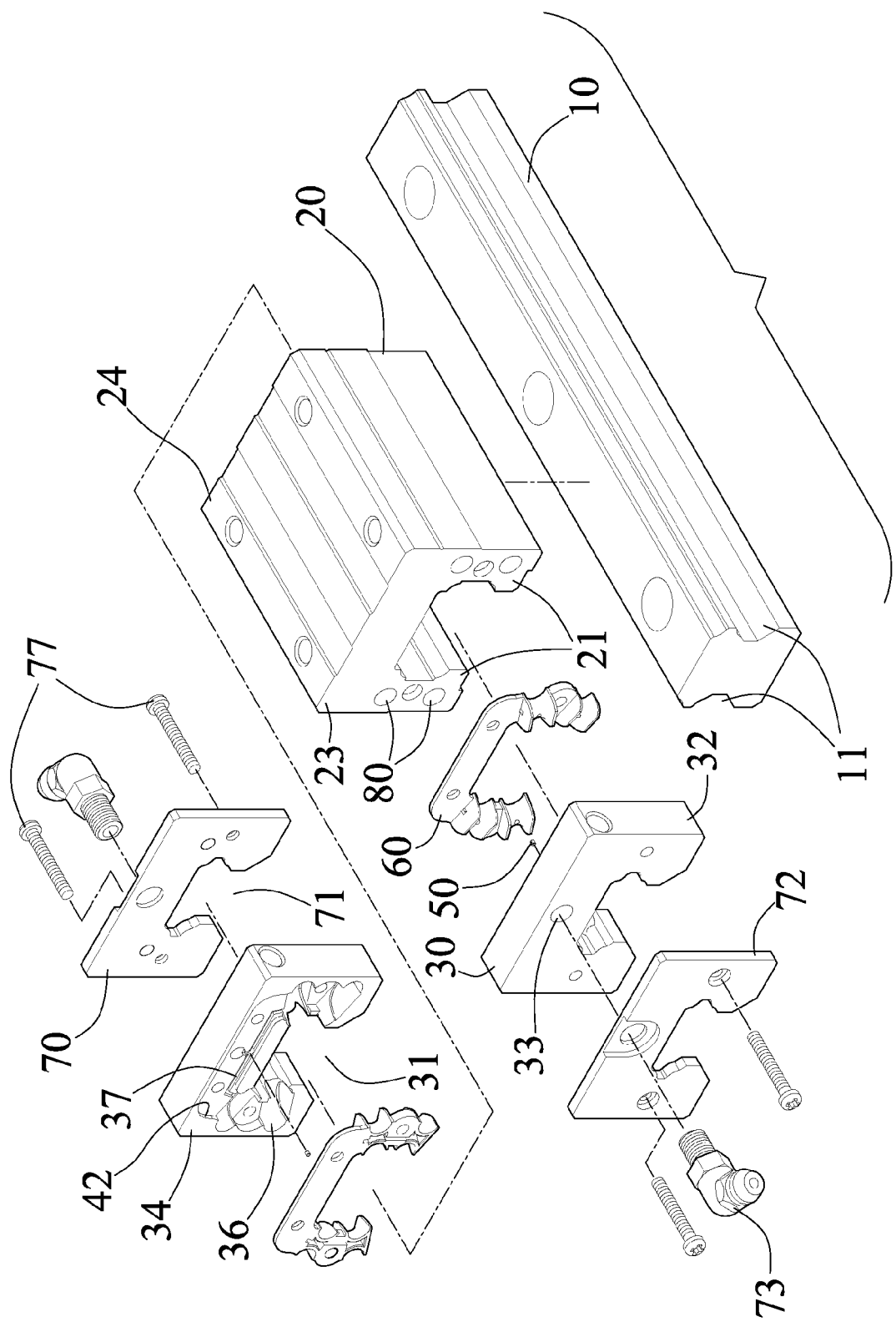
FIG. 2 is a partial exploded view of the linear motion guide apparatus.
Figure 3:
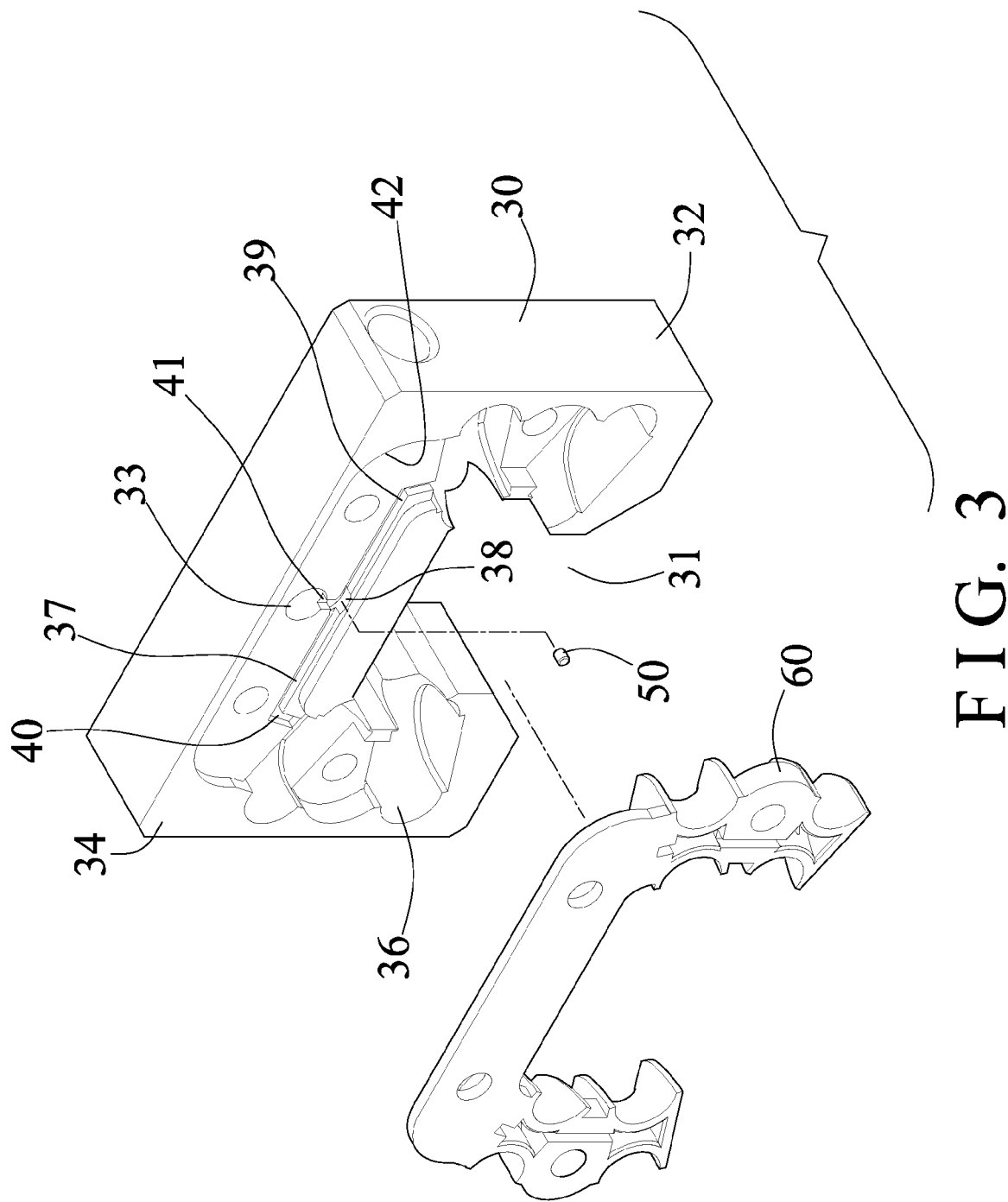
FIG. 3 is another partial exploded view of the linear motion guide apparatus.

The end caps 30 each include an entrance or inlet 33 formed therein (FIGS. 2-5), and a mouth piece 73 is attached or mounted or secured onto each of the dust caps 70 and engaged into the inlet 33 of the end cap 30 for filling or supplying the lubricant or lubricating oil or fluid into the end caps 30 and the endless ball guiding raceways 80 (FIGS. 2, 4 and 6) and for lubricating the ball bearing device 8. As shown in FIGS. 2 and 3, the end caps 30 each include a first end portion or first side 34 facing or directing toward the end portion 23, 24 of the slider 20 for contacting and engaging onto or with the end portion 23, 24 of the slider 20 respectively, and each include a second or opposite end portion or side 35 facing or directing away from the end portion 23, 24 of the slider 20 for contacting and engaging onto or with the dust cap 70 respectively, and each include two chambers 36 formed in the legs 32 respectively and formed and disposed or provided or located in the first side 34 of the end cap 30 for receiving or engaging with the ball bearing device 8.

The end caps 30 each further include a passage 37 formed therein, such as formed in the first side 34 thereof and intersecting or communicating with the two chambers 36 that are formed in the legs 32 for filling or supplying the lubricant or lubricating oil or fluid into the chambers 36 of the legs 32 of each end cap 30 respectively, and each include a guiding pathway 38 formed therein, also formed in the first side 34 thereof and located in the middle or intermediate portion of the passage 37 of the end cap 30 and communicating with the passage 37 of the end cap 30 for spacing or separating the passage 37 of the end cap 30 into two segments or portions or sections or passageways 39, 40 which are communicating with the two chambers 36 of the legs 32 of each end cap 30 respectively (FIGS. 3-4, 7-8).

The guiding pathway 38 may include a predetermined or selected shape or structure or configuration or contour, such as an oval or elliptical shape or the like for communicating with the inlet 33 of the end cap 30 and for allowing the lubricating fluid to flow from the inlet 33 of the end cap 30 into the guiding pathway 38 and the passageways 39, 40 of the passage 37 of the end cap 30, and then to flow into the chambers 36 of the end caps 30; or the end cap 30 may include one or more linking passages or slots or grooves 41 formed therein and communicating with or between the guiding pathway 38 and the inlet 33 of the end cap 30 for allowing the lubricating fluid to flow from the inlet 33 of the end cap 30 into the guiding pathway 38 of the end cap 30. The linear motion guide apparatus in accordance with the present invention further includes an adjusting or limiting member or slider or follower 50 slidably or movably received or engaged in the guiding pathway 38 of the end cap 30.

As shown in FIGS. 4-7, the follower 50 may be selected from a spherical ball, a cylindrical roller, or the like and includes an outer diameter (D, FIG. 7) greater than the inner diameter or depth or height of the passageways 39, 40 of the passage 37 of the end cap 30 for preventing the follower 50 from being moved or engaged into the passage 37 of the end cap 30, and/or the follower 50 includes a length (L, FIG. 7) equal to or slightly smaller than the diameter or height or dimension or depth (T) of the guiding pathway 38 of the end cap 30, but greater than the diameter or height or dimension or depth (t) of the passageways 39, 40 of the passage 37 and of the groove 41 of the end cap 30 for preventing the follower 50 from being moved or engaged into the passage 37 and the groove 41 of the end cap 30 and for limiting the follower 50 to slide or move within the guiding pathway 38 of the end cap 30.

Figure 5:
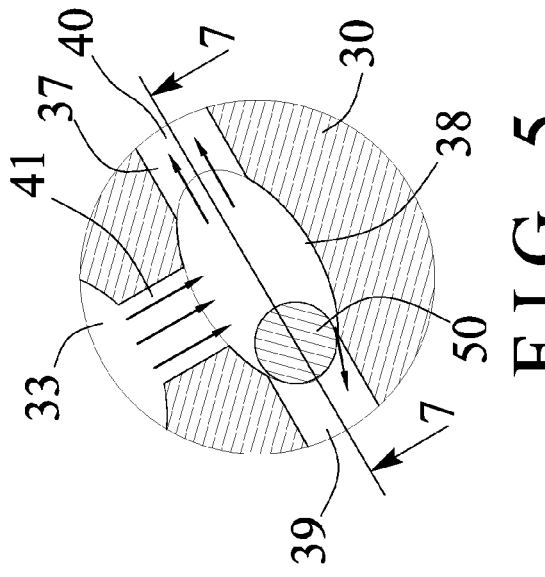
FIG. 5 is an enlarged partial cross sectional view of the linear motion guide apparatus.
Figure 4:
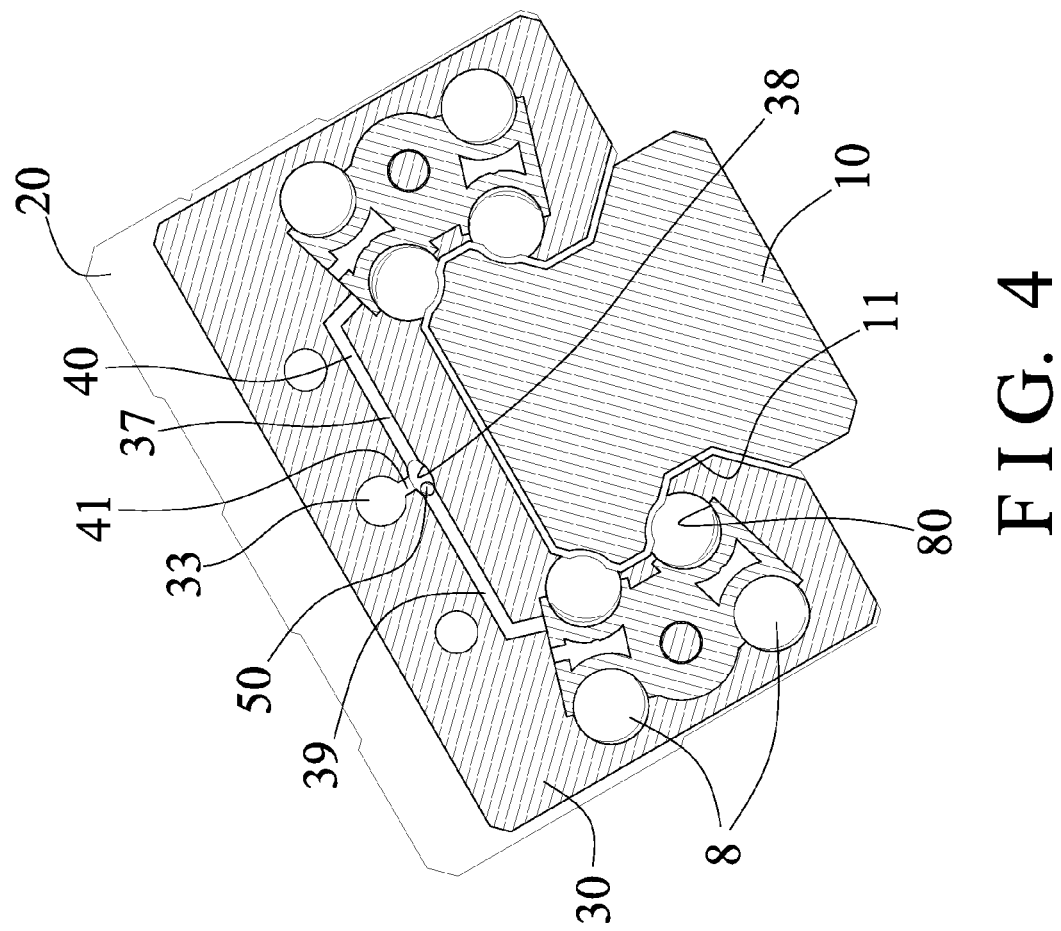
FIG. 4 is a cross sectional view of the linear motion guide apparatus taken along lines 4-4 of FIG. 1.
Figure 7:
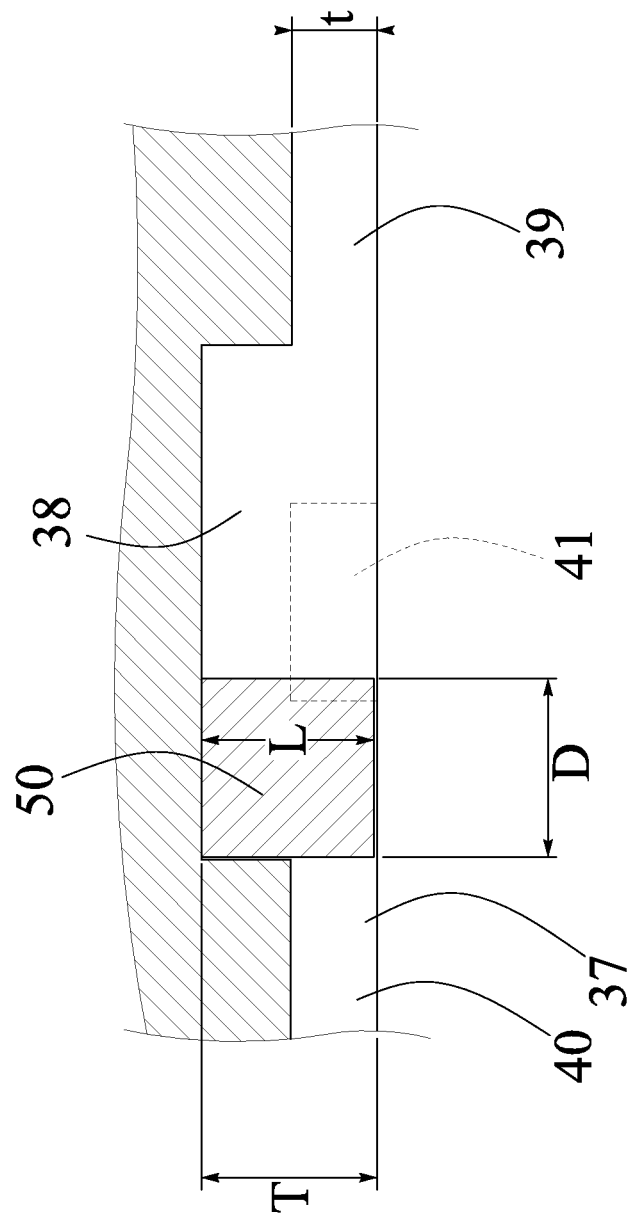
FIG. 7 is a partial cross sectional view of the linear motion guide apparatus taken along lines 7-7 of FIG. 1.

In operation, as shown in FIGS. 4 and 5, when the slider 20 and the guide rail 10 of the linear motion guide apparatus are disposed and located or supported on a tilted or inclined position or posture or status relative to the supporting ground or surface, the follower 50 may be moved toward one end or one side of the guiding pathway 38 of the end cap 30, and toward either one of the passageways 39 of the passage 37 of the end cap 30 due to the gravitational force, at this moment, the selected passageway 39 of the passage 37 of the end cap 30 will be partially blocked by the follower 50, but will not be completely blocked by the follower 50 (FIGS. 5, 6), for reducing or decreasing or for limiting the flowing speed and/or the flowing quantity of the lubricating fluid from the inlet 33 and/or the guiding pathway 38 into the selected passageway 39 of the passage 37 of the end cap 30.

If the selected passageway 39 of the passage 37 of the end cap 30 that is disposed and located below the other passageway 40 of the passage 37 of the end cap 30 has not been partially blocked or shielded by the follower 50, the lubricating fluid may mostly flow into the lower passageway 39 of the passage 37 of the end cap 30 due to the gravitational force, and only less lubricating fluid will flow into the upper or higher passageway 40 of the passage 37 of the end cap 30, such that the lubricating fluid may not be suitably and uniformly supplied to various portions or positions or locations or parts or elements of the linear motion guide apparatus. It is to be noted that, at this moment, the other or higher passageway 40 of the passage 37 of the end cap 30 has not and will not been blocked or shielded by the follower 50 such that the lubricating fluid may freely flow into the upper or higher passageway 40 of the passage 37 of the end cap 30.

Referring again to FIGS. 2 and 3, the linear motion guide apparatus in accordance with the present invention may further include a cap or shield or hood or cover 60 attached or mounted or secured to the first side 34 of the respective end cap 30 for blocking or shielding or covering the chambers 36 of the end cap 30 and for contacting and engaging with the follower 50 and for limiting the follower 50 to slide or move within the guiding pathway 38 of the end cap 30 and for preventing the follower 50 from being disengaged or separated from the end cap 30. The end caps 30 each may further include a depression or recess 42 formed therein and communicating with the guiding pathway 38 and/or the inlet 33 and/or the groove 41 and/or the passage 37 and/or the chambers 36 of the end cap 30 for receiving and engaging with and for anchoring or positioning the cover 60.

Figure 9:
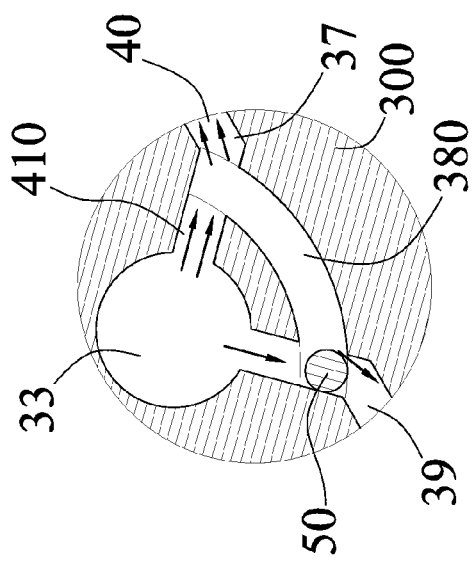
FIGS. 9, 10 are enlarged partial cross sectional views of the linear motion guide apparatus as shown in FIG. 8.
Figure 10:
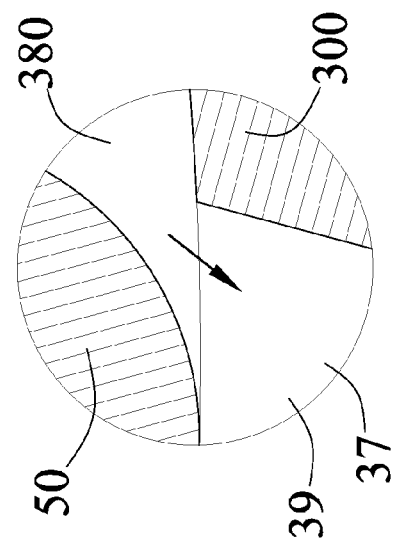
Figure 8:
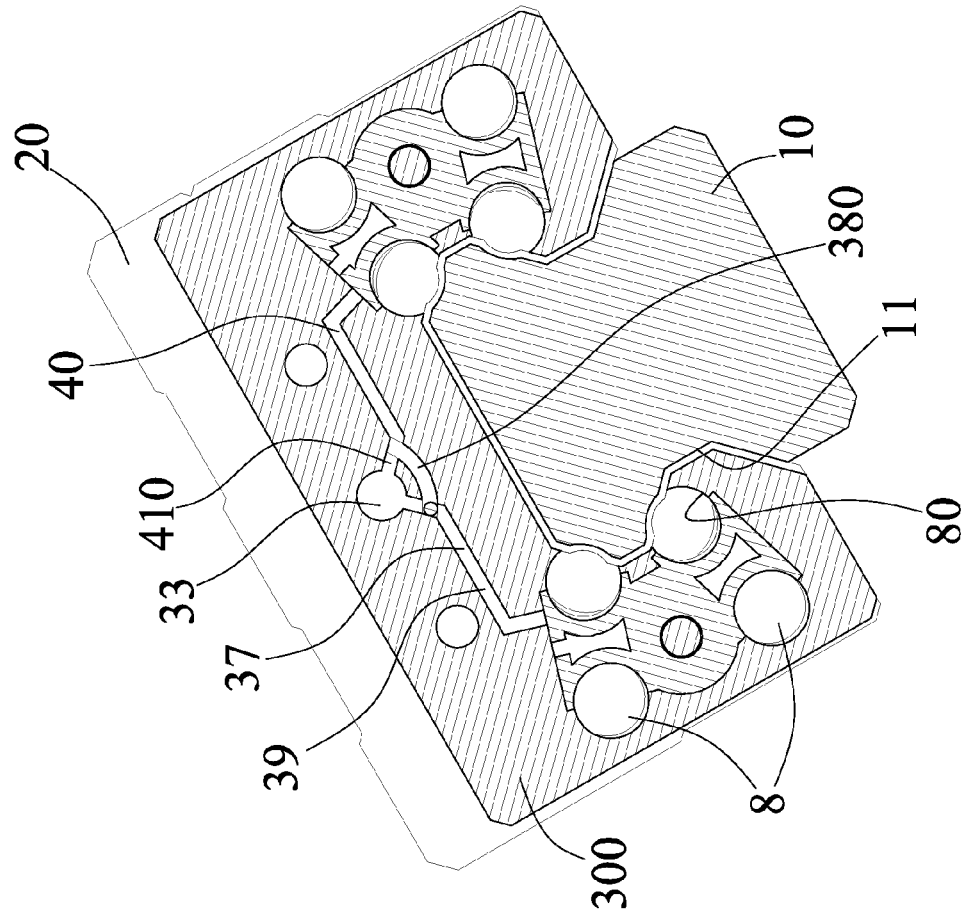
FIG. 8 is another cross sectional view similar to FIG. 4, illustrating the other arrangement of the linear motion guide apparatus.

Alternatively, as shown in FIGS. 9-10, the guiding pathway 380 of the end cap 300 may include or may be formed into the other curved shape or contour or various shape or structure or configuration or contour, such as the curved structure for slidably receiving or engaging with the follower 50 and for limiting the follower 50 to slide or move within the guiding pathway 380 of the end cap 300 and for preventing the follower 50 from being disengaged or separated from the end cap 300. The end cap 300 may include one or more (such as two) linking passages or slots or grooves 410 formed therein and communicating with or between the guiding pathway 380 and the inlet 33 of the end cap 300 for allowing and for guiding the lubricating fluid to flow from the inlet 33 of the end cap 300 into the guiding pathway 380 of the end cap 30.

Accordingly, the linear motion guide apparatus in accordance with the present invention includes a lubricating device or arrangement or structure designed and arranged for suitably and uniformly sending or applying or supplying the lubricant or lubricating oil or fluid to various portions or positions or locations of the linear motion guide apparatus, particularly when the linear motion guide apparatus is disposed and located or supported on a tilted or inclined position or posture or status relative to the supporting ground or surface.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A linear motion guide apparatus comprising:
a guide rail,
a slider slidably attached onto said guide rail for moving along said guide rail,
an end cap including a first side attached to and engaged with said slider and said end cap including a second side faced away from said slider, said end cap including a channel formed therein and defined between two legs for slidably receiving and engaging with said guide rail, and said end cap including an inlet formed in said end cap for receiving a lubricating fluid, and said end cap including two chambers formed in said legs and located in said first side of said end cap respectively, and said end cap including a passage formed in said first side of said end cap and communicating with said chambers of said end cap, and said end cap including a guiding pathway formed in said first side of said end cap and communicating with said inlet of said end cap for receiving the lubricating fluid from said inlet of said end cap, and said guiding pathway being communicating with said passage of said end cap for separating said passage of said end cap into a first passageway and a second passageway which are communicating with said chambers of said legs of said end cap respectively, and
a follower slidably received and engaged in said guiding pathway of said end cap and movable toward either said first passageway or said second passageway of said passage of said end cap for partially blocking either said first passageway or said second passageway of said end cap and for limiting a flowing speed of said lubricating fluid from said guiding pathway to either said first passageway or said second passageway of said end cap, and said follower including an outer diameter (D) greater than that of said first and said second passageways of said passage of said end cap for preventing said follower from being engaged into said passage of said end cap, and for limiting said follower to slide within said guiding pathway of said end cap.

2. The linear motion guide apparatus as claimed in claim 1, wherein said guiding pathway of said end cap includes an elliptical shape.

3. The linear motion guide apparatus as claimed in claim 1, wherein said end cap includes at least one groove formed therein and communicating with said guiding pathway and said inlet of said end cap.

4. The linear motion guide apparatus as claimed in claim 1, wherein said follower includes a length smaller than a depth of said guiding pathway of said end cap, and greater than a depth of said passage of said end cap.

5. The linear motion guide apparatus as claimed in claim 1 further comprising a cover attached to said first side of said end cap for engaging with said follower and for limiting said follower to move within said guiding pathway of said end cap and for preventing said follower from being disengaged from said end cap.

6. The linear motion guide apparatus as claimed in claim 5, wherein said end cap includes a recess formed therein and communicating with said guiding pathway for receiving and engaging with said cover.

* * * * *